(12) United States Patent
Lines (10) Patent No.: US 8,954,661 B2
(45) Date of Patent: Feb. 10, 2015

(54) BINARY SEARCH PIPELINE

(75) Inventor: Andrew Lines, Malibu, CA (US)

(73) Assignee: Intel Corporation, Santa Clara, CA (US)

( * ) Notice: Subject to any disclaimer, the term of this patent is extended or adjusted under 35 U.S.C. 154(b) by 809 days.

(21) Appl. No.: 12/944,350

(22) Filed: Nov. 11, 2010

(65) Prior Publication Data

US 2012/0110049 A1    May 3, 2012

Related U.S. Application Data

(60) Provisional application No. 61/409,380, filed on Nov. 2, 2010.

(51) Int. Cl.
*G06F 12/00* (2006.01)
*G06F 17/30* (2006.01)

(52) U.S. Cl.
CPC ............................. *G06F 17/30988* (2013.01)
USPC .......................................................... 711/108

(58) Field of Classification Search
USPC ............................ 707/609; 709/238; 711/108
See application file for complete search history.

(56) References Cited

U.S. PATENT DOCUMENTS

| | | | | |
|---|---|---|---|---|
| 5,263,160 | A  * | 11/1993 | Porter et al. ........................... | 1/1 |
| 6,549,519 | B1 * | 4/2003 | Michels et al. ............... | 370/238 |
| 6,973,454 | B2 * | 12/2005 | Fujihara ............................... | 1/1 |
| 2002/0023089 | A1 * | 2/2002 | Woo ............................... | 707/101 |
| 2004/0019737 | A1 * | 1/2004 | Kastoriano et al. ........... | 711/104 |
| 2006/0050968 | A1 * | 3/2006 | Oh et al. ....................... | 382/219 |
| 2009/0299971 | A1 * | 12/2009 | Nagoya ............................. | 707/3 |
| 2012/0023082 | A1 * | 1/2012 | Kotha et al. .................... | 707/706 |

* cited by examiner

*Primary Examiner* — April Y Blair
*Assistant Examiner* — Trang Ta
(74) *Attorney, Agent, or Firm* — Blakely, Sokoloff, Taylor & Zafman LLP (57) ABSTRACT

Efficient hardware implementations of a binary search algorithm are provided.

16 Claims, 6 Drawing Sheets

BINARY SEARCH PIPELINE

RELATED APPLICATION DATA

The present application claims priority under 35 U.S.C. 119(e) to U.S. Provisional Patent Application No. 61/409,380 for BINARY SEARCH PIPELINE filed on Nov. 2, 2010, the entire disclosure of which is incorporated herein by reference for all purposes.

BACKGROUND OF THE INVENTION

The present invention relates to efficient hardware implementations of a binary search algorithm.

The term "binary search" refers to an algorithm for locating the position of an element in a sorted list. Initially, the algorithm compares the middle element of the sorted list to a key value. If that element is equal to the key, then the position has been found. Otherwise, the upper half or lower half of the list is chosen for further searching based on whether the key is greater than or less than the middle element. This continues iteratively until either the position is found, or the key is determined not to be in the list. Each iteration of the binary search algorithm reduces the number of elements needed to be checked by a factor of two, finding the key (if it exists in the list), or determining that the key is not present, in logarithmic time. This is to be contrasted with linear search in which the key is compared to each element in an unsorted list sequentially until the position is found.

SUMMARY OF THE INVENTION

According to the present invention, efficient hardware implementations of a binary search algorithm are provided. According to various specific embodiments, a circuit is provided that is configured to perform a search for a key in a sorted list of entries using a plurality of binary search iterations. The circuit includes plurality of binary search pipeline stages configured in a pipeline. Each pipeline stage includes memory storing an orthogonal subset of the entries relative to the subsets of the entries in the memories of all others of the pipeline stages. The memory in each successive pipeline stage has exponentially more storage capacity (each stage having twice the memory of the preceding stage) and includes entries corresponding to a particular one of the binary search iterations. Comparison circuitry is provided that is configured to compare the key to a particular entry stored in the memory of the pipeline stage, generate a comparison result, and pass the key and the comparison result to the immediately subsequent pipeline stage. The comparison result indicates whether the key is greater than or equal to, or less than the particular entry to which the key was compared. The comparison circuitry also selects the index for the next stage's lookup.

According to a specific embodiment, the circuit further includes a parallel comparison stage preceding an initial one of the pipeline stages. The parallel comparison stage includes N registers each storing one of the entries, and parallel comparison circuitry configured to compare the key to each of the entries in the N registers in parallel, generate a parallel comparison result, and pass the key and the parallel comparison result to the initial pipeline stage. The initial pipeline stage is configured to use the parallel comparison result to select the particular entry in the memory of the initial pipeline stage to which the key is compared. The parallel comparison stage corresponds to the first $\log_2 N$ of the binary search iterations.

According to another specific embodiment, the memory in each pipeline stage is configured in a plurality of slices, each slice including a unique subset of the entries in the memory. According to an even more specific embodiment, the comparison circuitry in each pipeline stage is configurable to compare different size keys by combining comparisons between slices. According to an even more specific embodiment, each slice is configured to identify a particular one of a plurality of actions to perform on a data unit corresponding to the key, and wherein the circuit is configured to identify multiple actions for keys spanning multiple slices.

According to another specific embodiment, one or more additional bits are associated with the key, the circuit further comprising an action table comprising a plurality of entries. Each entry in the action table corresponds to a particular action to perform on a data unit corresponding to the key. The one or more additional bits are used as an index into the action table.

According to another specific embodiment, the entries in the memory of each pipeline stage correspond to two consecutive binary search iterations, and the circuit further includes speculative comparison circuitry associated with each pipeline stage configured to compare the key to each of two entries associated with the second one of the binary search iterations that correspond to the particular entry, generate speculative comparison results corresponding to the two entries. The comparison circuitry in each memory stage is also configured to select one of the speculative comparison results based on the comparison result received from the immediately preceding memory stage.

According to various other specific embodiments, the comparison circuitry in each of the pipeline stages is alternatively configurable to perform a prefix match comparison, an exact match comparison, or a range table comparison.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to various embodiments of the present invention, efficient hardware implementations of a binary search algorithm are provided. Various specific embodiments including a number of optimizations of the basic design are also described.

An example of a particular embodiment will now be described in the context of an array that includes 1024 sorted 32-bit values having indices in ascending order, i.e., the lowest index in the array corresponds to the lowest 32-bit value, and the highest index corresponds to the highest 32-bit value. If implemented in C, the algorithm would look like:

```
int findIndex(int Key; int k[1024]) {
    int i=1024/2, step=1024/2;
    while (step>0) {
        step=step/2;
        if (Key>=k[i]) i+=step;
        else i-=max(1,step);
    }
    return i;
}
```

Figure 1:
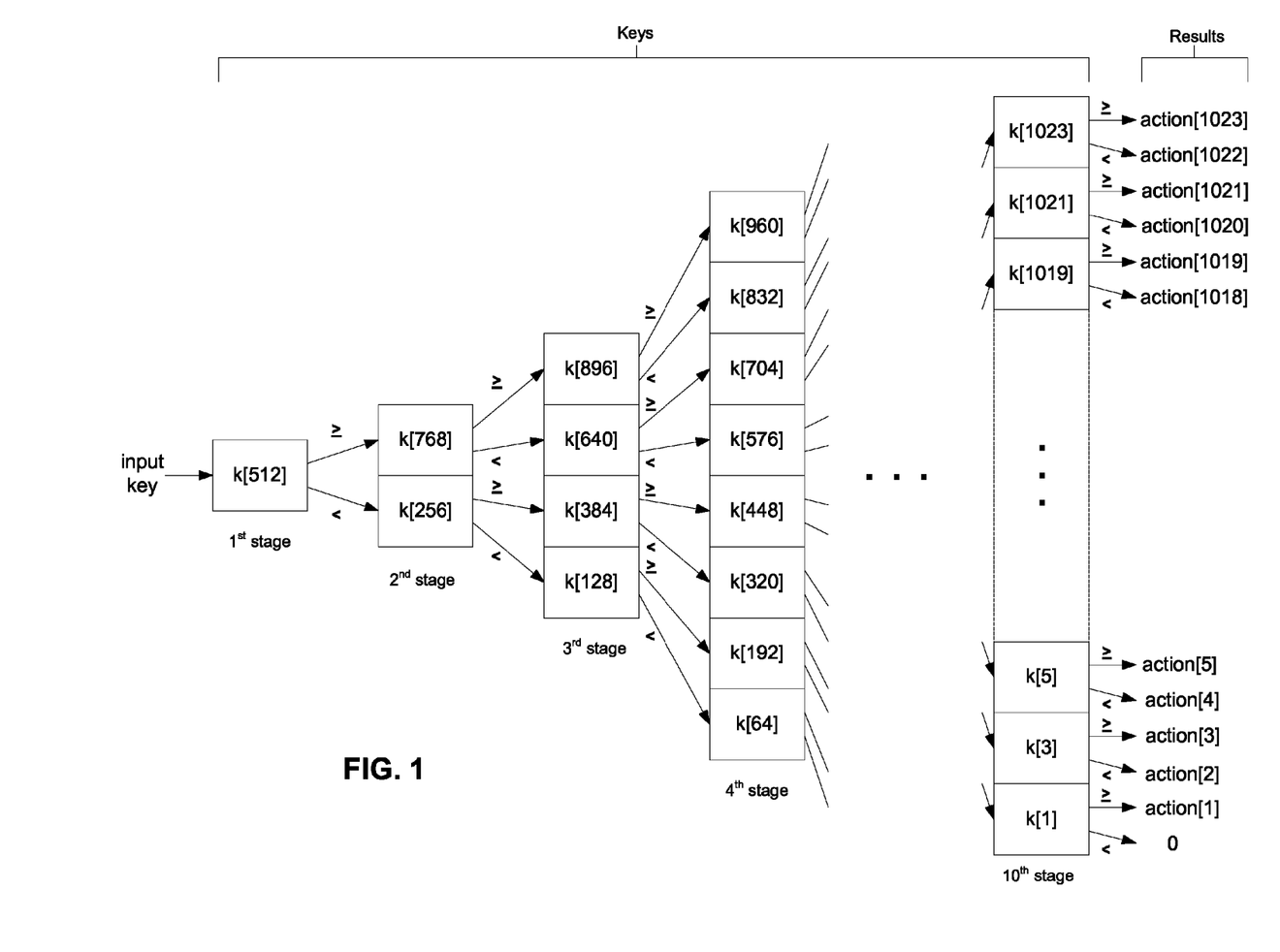
FIG. 1 is a block diagram illustrating a binary search pipeline according to various embodiments of the invention.

According to this embodiment of the present invention, the iterative binary search algorithm is unrolled into a pipeline in which the values k[0 . . . 1023] are distributed through SRAM stages of increasing size according to the iteration in which they are needed. That is, for example, and as illustrated in FIG. 1, k[512] is stored in the $1^{st}$ stage, k[256] and k[768] are stored in the $2^{nd}$ stage, k[128], k[384], k[640], and k[896] are stored in the $3^{rd}$ stage, etc. This results in a pipeline of SRAM stages of exponentially increasing size.

At each stage, a comparison is made between the key value for which the search is being conducted, and the relevant one of the stored values in that stage. In the first stage, the key is compared to k[512], i.e., the value stored at index 512. Because the values are stored in sorted, ascending order, if the key is greater than or equal to k[512], the key (if it is in the array) is stored at index 512 or above. If, on the other hand, the key is less than k[512], the key (if it is in the array) is stored at an index below 512. Depending on the result of this first comparison, the key is then compared to the appropriate one of the two values stored in the $2^{nd}$ stage, i.e., either k[768] or k[256].

Stated more generally, the comparison chooses between >= or <. In early stages, the branching goes to i'=i+ step for K>=k[i] or i'=i-step for K<k[i]. At the very last stage, the branching goes to index i'=i for K>=k[i] or i'=i-1 for K<k[i]. Note that this last stage has an asymmetric step of 0 for >= or −1 for <, but this ends up finding the right i such that k[i]<=K<K[i+1], i.e., the desired final state of the algorithm That is, once half of the array has been eliminated, the index that is halfway between the upper and lower bounds of the remaining half of the array is chosen for the next comparison. This process is iterated, resulting in ever tighter upper and lower bounds on the range of possible indices, until the last index in the final stage is reached (i.e., the upper and lower bounds are equal), and it is then determined that either the value stored at this final index is the value being searched for (i.e., the key), or the key value is not stored in the array. This embodiment requires $\log_2$ (N) stages which, in this example, is 10.

As should now be clear, the possible set of values for comparison to the key in each successive iteration are orthogonal sets, e.g., k[512] will only be compared to the key once. Thus, instead of iterating on the same array (which would present a significant bandwidth bottleneck), the orthogonal sets of array values are stored in successively larger SRAMs arranged in series. The result of each stage's comparison is then used to identify the index for the next iteration.

According to one class of embodiments, each of the stages of the binary search circuit is implemented in SRAM, with each successive stage storing twice as many entries as the last. In the example of 1024 32-bit values, the first stage has a single 32-bit entry, the second stage has two 32-bit entries, the third has 4, the fourth 8, the fifth 16, and so on, until the $10^{th}$ stage which has 512 entries. Thus, in this example, 10 lookups are performed in 10 different SRAMs, as opposed to the conventional algorithmic approach in which 10 lookups would be performed sequentially on the same SRAM.

It is worth noting that, according to a specific embodiment, when the number of entries in the successive stages is added up, the total comes to $2^N-1$, or in this example, 1023. The "missing" entry corresponds to the index 0. According to this implementation, if the result of the lookup is this index, then that means that the key being searched for is less than every value in the array, and the result is therefore treated as a "miss."

According to various specific embodiments of the invention, optimizations are provided which take advantage of the basic binary search pipeline described above to enable some powerful functionalities. Various embodiments will be described with reference to 16K-entry SRAMs (rather than the 1024 entries in the example above).

Optimization 1—16-Way Parallel Root Comparison

According to a particular class of embodiments, a parallel comparison is provided at the front end of the pipeline to save both latency and area. That is, small SRAMs (e.g., 1-entry, two-entry, etc.) are not area-efficient in that they have a large amount of overhead relative to the actual storage capacity. Therefore, instead of SRAM stages to implement the first few stages of the binary search circuit pipeline, specific embodiments of the invention employ discrete registers that are read and compared in parallel rather than in series.

Figure 2:
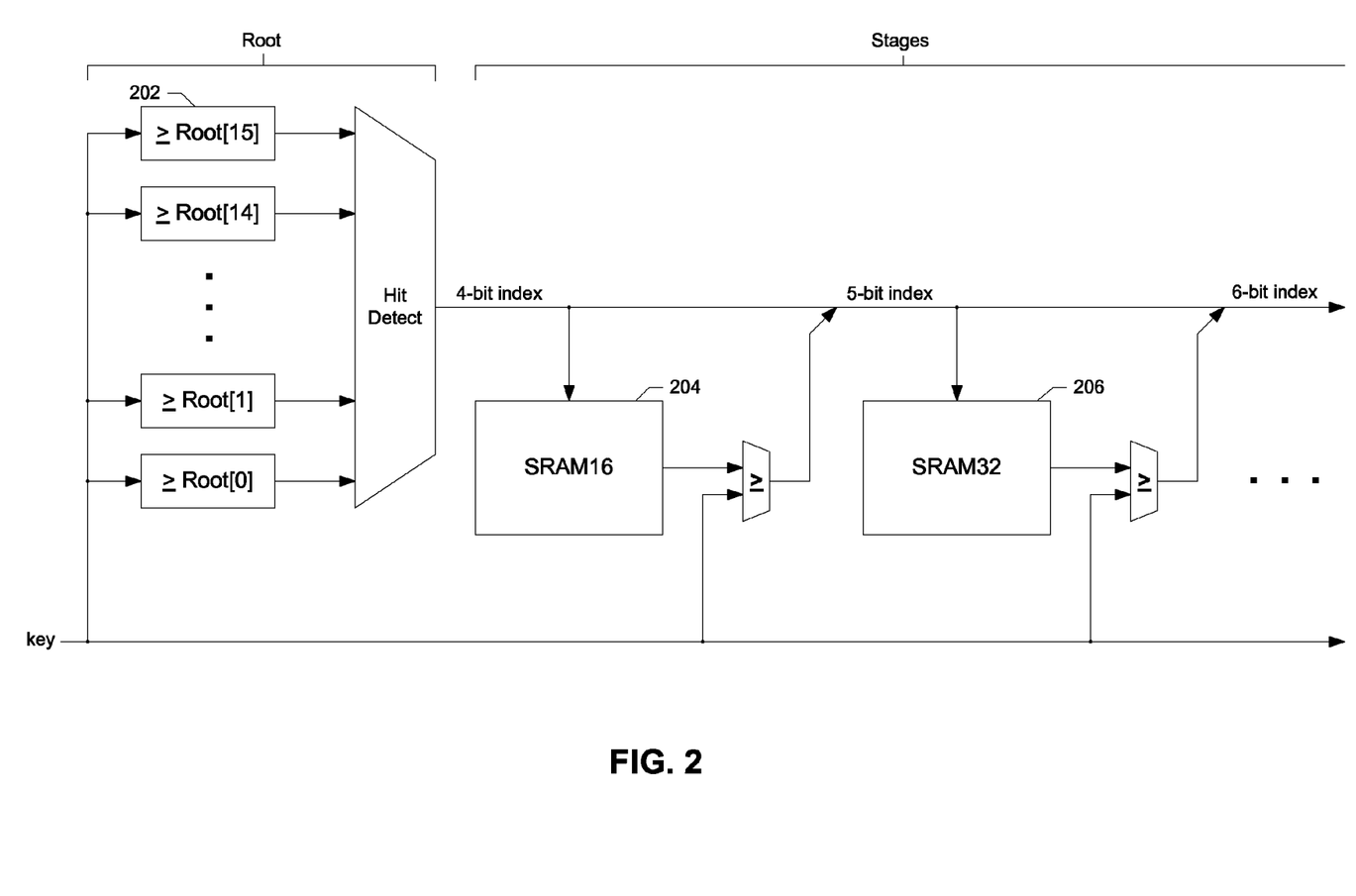
FIG. 2 is a more detailed block diagram illustrating a binary search pipeline according to various embodiments of the invention.

According to a particular implementation illustrated in FIG. 2, 16 such registers 202 are provided to implement a 16-way parallel comparison that takes the place of the first four stages of the 10-stage pipeline described above. The successive stages of the pipeline are then implemented in SRAM beginning with a 16-entry SRAM 204 followed by a 32-entry SRAM 206, and so on. This parallel comparison effectively "discovers" the first 4 bits of the final index in a faster and more area efficient manner, with each successive bit (i.e., bits 5-10) being discovered by the successive SRAM stages.

The use of discrete logic to implement the parallel comparison at the root of the binary search pipeline enables a more powerful functionality than would be feasible if all of the stages of the pipeline were implemented in SRAM.

According to a specific embodiment, the result of the 16-way comparison is treated as a 4-bit partition number that maps to one of sixteen 1023-entry partitions. That is, the four bits "discovered" by the 16-way comparison are used as in index into a 16-entry by 4-bit SRAM to retrieve another 4-bit value which maps to the partition in which the binary search is to proceed. The remaining stages of the binary search to discover 10 additional bits in the selected partition. Thus, the end result of the lookup in this embodiment is actually a 14-bit value, i.e., 4 bits of partition and 10 bits of index. As will be understood, the successive stages of each partition may all be implemented as part of the same SRAM. That is, the first SRAM stage following the 16-way discrete logic comparison is a 16-entry SRAM with 16 partitions having 1 entries each.

Partitions means you can split the table into multiple tables that can be used orthogonally, or used exclusively, i.e., you can only use tables represented by particular partitions. One nice feature of partitions is that, while you have to maintain sorting within a partition, you don't necessarily need to do so as between partitions.

Partitions may also support an efficient way of adding sorted entries. That is, one very useful functionality that is enabled by this approach is the ability to swap partitions in and out of a lookup resource while the system of which the resource is a part is operating, i.e., a "hot swap." For example, in the context of IP routing, implementing a routing table with this binary search circuit would enable the routing table to be updated on the fly.

According to a particular embodiment, one or more of the partitions can be treated as a "scratch" partition to which new values can be added at arbitrary times. Once all of the desired values are added, the scratch partition can then be swapped for one of the other partitions in a single operation, e.g., in one cycle. Such a functionality could be used, for example, in the context of IP routing to add several hundred entries to a routing table while traffic is flowing through the system.

Optimization 2—Speculatively Evaluate 2 Stages in Parallel

Figure 3A:
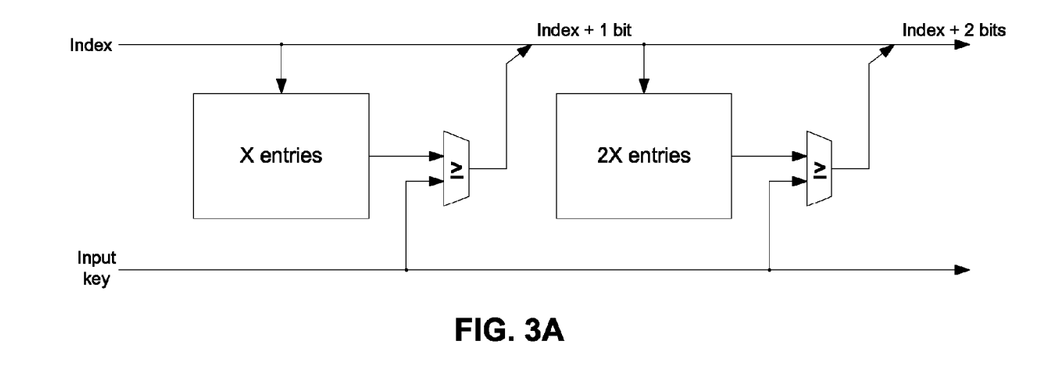
FIGS. 3-6 are block diagrams illustrating optimizations of a binary search pipeline according to various embodiments of the invention.
Figure 3B:
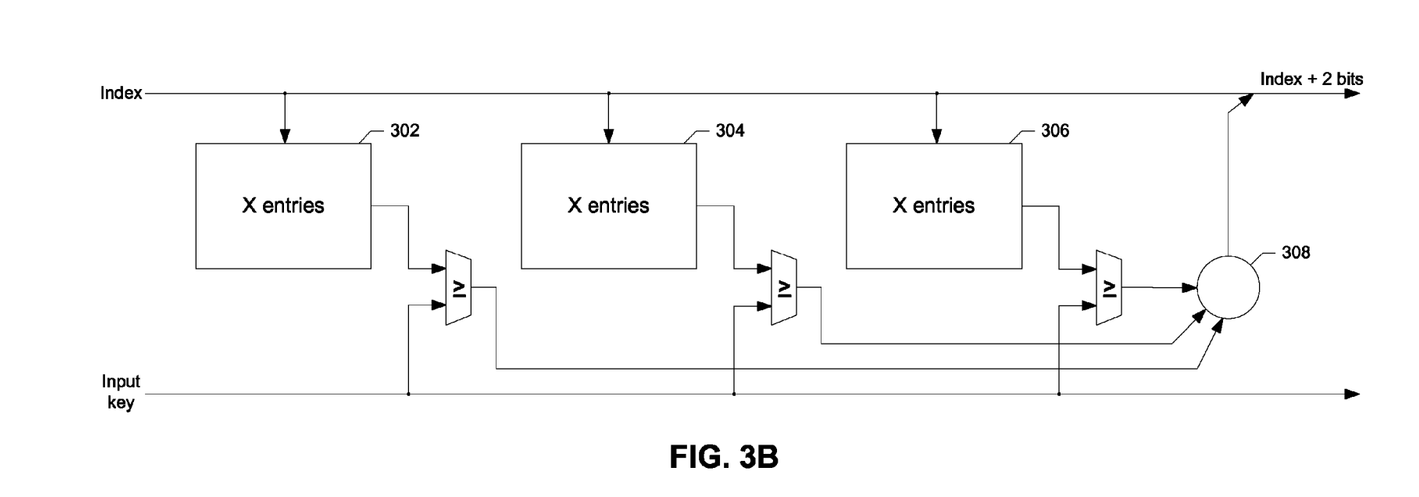

According to some embodiments of the invention, following the parallel comparison, the radix of the binary search is changed. That is, instead of only one lookup in each iteration, multiple lookups are performed simultaneously. For example, instead of 2-way branching based on each iteration (as shown in FIG. 3A), four-way branching may be used, e.g., three lookups spanning two neighboring stages of the algorithm may be performed to reduce latency (as shown in FIG. 3B). That is, one lookup for the current stage (SRAM 302), and both possibilities (SRAMs 304 and 306) for the following stage. Based on the result of the first stage you then pick (logic 308) the appropriate one of the two results from the second stage. Thus, three lookups are speculatively performed simultaneously instead of two sequentially, effectively cutting the latency in half, i.e., two iterations done in the time of a single iteration. However, the increase in the number of lookups results in an increase in power dissipation (i.e., attributable to the unused lookup result). As will be understood, there is a balance to be struck between additional power dissipation and reduction in latency which may be different for different applications. According to a particular implementation, four-way branching is selected. However, it should be understood that a different radix might apply for a given application.

Because we are free to pick the search radix, the stage of the binary search circuit following the 16-way parallel comparison is three 16-entry SRAMs which are small, but sufficiently large to be done efficiently using SRAM. Each successive stage then grows by 4× (i.e., three 64-entry SRAMs, three 256-entry SRAMs, etc.) rather than 2×.

Optimization 3—Cascade Keys

In some embodiments, the keys are 32-bit keys. However, in some applications, the keys being looked up may be wider and/or there may be keys of different widths that are processed by the same circuitry. Therefore, according to a specific embodiment of the invention, four 32-bit key binary search pipelines are implemented in parallel and in a way which enables these four "slices" to be configured and used in a highly flexible manner. For example, the four slices may be configured as a single large lookup that includes 4 times the entries of a single pipeline.

Alternatively, slices can be cascaded to look up 64, 96, or 128-bit keys, i.e., combining 2, 3, or 4 slices, respectively. Each of the cascaded slices makes an independent 32-bit comparison, the results of which are then "combined" to determine the cascaded result for the next stage, and the result is broadcast to next stage for each of the slices. So, for example, if the key being looked up is a 64-bit key, and the result of the more significant 32-bit slice lookup is "greater than" then this is the result of the lookup. On the other hand, if the result of the more significant lookup is "equal to," then the result from the less significant 32-bit slice lookup is used.

Figure 4:
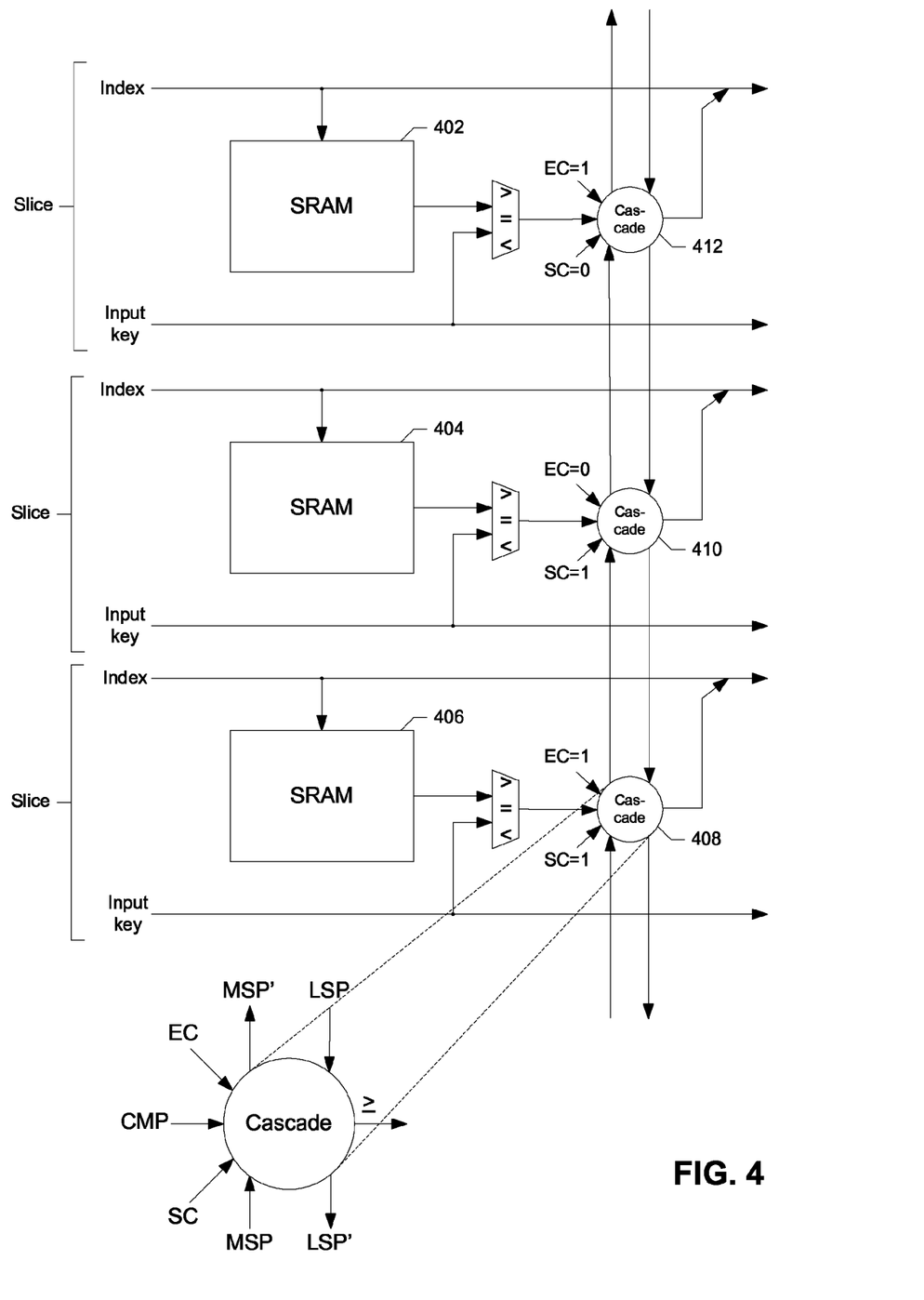

FIG. 4 illustrates the cascading of 3 such slices according to a specific implementation. SRAMs 402, 404, and 406 may be configured to be part of independent parallel pipelines. However, by setting input bits SC (start cascade) and EC (end cascade), cascade logic 408, 410, and 412 are configured to combine the comparisons across the member slices of the cascade. As shown, cascade logic 408 has SC=1 and EC=1, cascade logic 410 has SC=1 and EC=0, while cascade logic 412 has SC=0 and EC=1. This configuration uses single width keys in the slice including SRAM 406, while combining two slices to use double-width keys in the slice including SRAMs 404 and 402. To minimize the latency, the circuit was design to ripple a most-significant-prefix (MSP) comparison from the most-significant slice to least-significant slice, and in parallel, ripple a least-significant-prefix (LSP) comparsion in the opposite direction. Thus each slice collects information from the slices above and below it in the cascade, and all slices produce consistent comparison results. The CMP, MSP, and LSP channels encode 3 cases (less than, equal to, and greater than) because this is necessary to compute the final >=comparison. The logic for this compare can be designed with standard techniques.

In the context of IP routing, this architecture allows for IPv4 (32-bit lookups) and IPv6 (128-bit lookups) routing to be done simultaneously using the same hardware. In addition, Ethernet (which uses 60-bit keys) can be done with this architecture.

According to some embodiments implemented in the context of packet switching, one or more "scenario" bits identifies the type of packet being processed and therefore the type of lookup that needs to be performed, i.e., which partition to select. In addition, 4 bits of TCAM resource are added to enable programmable selection of a partition depending on packet characteristics. This enables efficient implementation of virtual routers in which many different routing tables need to be maintained.

Optimization 4—Prefix Match

According to some implementations, the same hardware is configurable to support both "exact match" and "prefix match" searches. Exact match search is important, for example, in the context of IP routing for identifying the specific machine to which a packet is addressed, i.e., the destination IP address. Prefix match search is like exact match (i.e., exact match is a special case of prefix match) except that it ignores some number of the least significant bits. Again referring to the context of IP routing for an example, many routing algorithms only need to look at the top 24 bits of a 32-bit value to make certain decisions.

Figure 5:
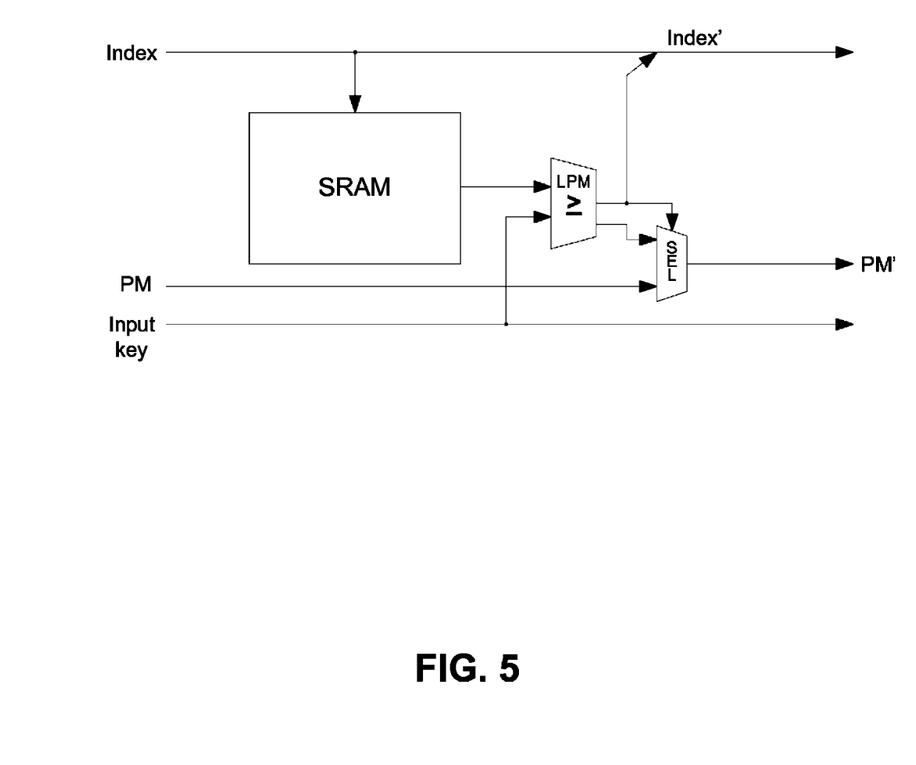

According to a specific class of implementations, in addition to determining whether the key is greater than, less than, or equal to the key, the prefix match "length" is also determined by determining how many of the least significant bits do NOT match the key. So, for example, if an exact match is found, this number is "0." As shown in FIG. 5, the prefix match length is tracked through each successive stage of the binary search pipeline through a channel that propagates the number of bits that match for the closest entry encountered so far. Each stage combines a >=compare with the LPM compare, and if the new comparison result is >=, also replaces the rippling PM field. Whatever the PM field is at the end of the pipeline is compared against a field of the action SRAM to determine if the lookup key satisified the prefix match. So, for example, there might be a requirement that a specific action be taken or a particular rule is only valid if the key is within some range defined by the prefix match, e.g., a rule is valid where the key is within 2" of the target key. Or, put another way, you would have an n-bit range that would all map to the same result.

According to another class of embodiments, a binary search pipeline constructed in accordance with the invention may be configured to implement another special case of prefix match, i.e., a range table. A range table is not concerned with the upper bound, but instead whether the key is greater than or equal to a particular entry and less than the next entry, i.e., all numbers x greater than or equal to a AND less than b go into the same bin. This can be accomplished by disabling the prefix match comparison. A range table can be used by IP routing algorithms, for example, to identify TCP/UDP port numbers, e.g., ports 255-259 belong to a particular protocol.

According to a particular class of embodiments, this configurability is implemented in the comparison circuit which does both a 3-way compare, and a prefix length compare. Any time the result is "greater than or equal to," the index is updated, and the best prefix match so far is saved. Thus, when the end of the pipeline is reached, the final index as well as the number of bits matched may be identified.

From the foregoing, it will be appreciated that the binary search pipeline can be configured rule-by-rule. That is, every entry in the pipeline can be either an exact match, a prefix match, or "from here on to the next entry," i.e., a range match. There is also a representation of a "NO OP." A range table is somewhat generic in that every key maps to some range, although some of the ranges represent a miss; which is different from not finding anything, i.e., the key was found, it just didn't lead to an action.

The current design costs some extra area in that it requires area for the comparators, e.g., a two-bit comparison result and a 5-bit prefix match count; the prefix match circuit being more complicated than a 3-way compare. For example, if there are 15 stages of comparison in the SRAM section that each require a prefix compare, and then there are 4 slices to get out to 128-bit keys, so there are actually 60 comparators.

Thus, the hardware can do all three modes, i.e., exact match, prefix match, and range match, all mixed up in any way you like.

Optimization 5—Additional Conditions

Figure 6:
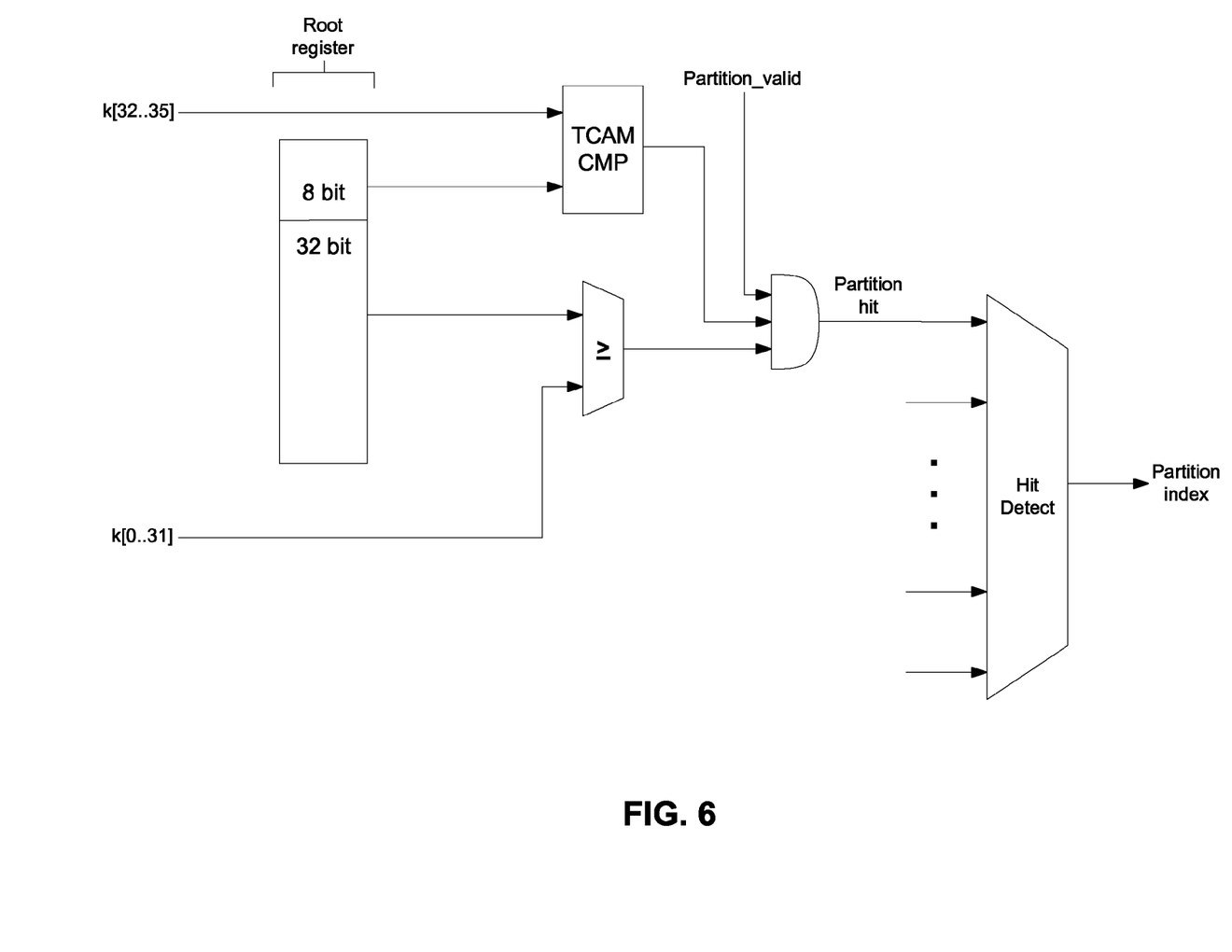

According to some embodiments, the discrete logic at the root of the binary search circuit (e.g., as shown in FIG. 2) is combined with the use of wider keys in the parallel lookup portion of the circuit to enable the encoding and application of additional conditions relating to processing of the key. For example, as shown in FIG. 6, a 36-bit key could be used in which the bottom 32 bits correspond to the numeric key value being searched, while the top four bits are used to identify conditions that enable each partition (e.g., in TCAM 602) for handling the key or some other value or unit to which the key corresponds, e.g., if the highest order bit is set, then the key is invalid, or when a specific pattern of bits is set, a particular set of processing rules applies. Because the root is not that big, advantageous features with such additional conditions may be added without adding significant overhead to the overall circuit. One preferred implementation is 4 extra bits of key and 8 extra configuration bits. The 8 bits are used like a TCAM, and encode for each of the top 4 bits of the key, if it must be 0, must be 1, don't care in order for the partition to be valid.

In the context of IP routing, these condition bits might, for example, identify the type of packet being processed (e.g., IPv4 or IPv6), the port on which a packet was received, type of frame (unicast vs. multicast), routing context, virtual router table number, scratch partition, etc. And depending on these conditions, specific partitions of the binary search circuit may be selected. For example, ¼ of the partitions might be dedicated to IPv4 routing while ¾ might be dedicated to IPv6 routing. Alternatively, half could be used for IP multicast, and the other half for IP unicast. Thus, the same hardware resources may be used for different purposes. A wide variety of other possibilities for using such extra condition bits will be appreciated by those of skill in the art.

According to a particular implementation, in addition to the prefix match comparison, additional information is provided that map to a wide variety of action options. That is, the binary search pipeline "remembers" the prefix match and provides a 14-bit index into a 16K entry Action SRAM, from which (assuming a "hit" based on the prefix match comparison) a 50-bit value is retrieved; 8 bits representing the prefix length, and 42-bits being a number of fields representing the actions to be taken. Such action options might include, for example, routing options, dropping, counting, policing, rate throttling, changing frame priority, changing frame VLANs, route frames, switch frames, send frames to a processor, etc. If a sufficient number of bits of the key do not match, i.e., the prefix match comparison is negative, some default behavior is selected, e.g., send the packet to a default router, drop the packet, etc.

In the context of frame processing pipelines in packet switches, the conventional approach to achieve this kind of functionality and configurability is to use off-chip TCAMs which are immensely power hungry and represent significant additional cost, e.g., hundreds of dollars extra. In addition, such off-chip TCAMs don't provide the action table, i.e., they only provide the index into a separate table. By contrast, a binary search pipeline implemented according to specific embodiments of the invention uses considerably less power than a TCAM, is low latency, and can reside on-chip along with the action tables with as many as a million or more entries in current generations. And this can be done in comparable area to that generally taken up by the I/O circuitry necessary for communicating with the off-chip TCAM. Compared to on-chip TCAM's, the area cost of a large BSP approaches ¼, while the power can be ¹/₁₀.

And as described above, some implementations of the binary search pipeline have 4 "slices" of 16K entries each, each of which can perform one "action." So, for 32-bit lookups, 4 different actions could be performed; for 64-bit lookups, 2 different actions could be performed for the same rule; and for 128-bit lookups, up to four actions could be performed for the same rule. And these different scenarios could occur using the same hardware on consecutive lookups.

The binary search pipeline is almost as functional as a TCAM, with the exception that it can't mask out higher order bits. That is, TCAM is a masked compare in which bits are masked and a compare for exact match is performed. The binary search pipeline is an ordered compare, and then we can add some number of bits on the top (e.g., four) that do a masked compare (e.g., the 16-way parallel compare described above). Thus, a binary search pipeline could be used to do an IP lookup, a multicast lookup, an ACL, etc. It can perform the same function in a frame processing pipeline as a TCAM, with the advantage that it is considerably more area and power efficient.

The binary search pipeline and TCAM can work very well together. For example, adding entries to a binary search pipeline is typically a cumbersome process involving sorting within a scratch partition, copying of the scratch partition in, and then possibly sorting the partitions. This takes considerable time and processing resources. On the other hand, if the binary search pipeline is combined with a TCAM, entries can be added to the TCAM quickly and the change can take effect right away. This can be done until there are a sufficient number of new entries to be added to the binary search pipeline as a batch. Effectively, the TCAM acts as a temporary cache for modified entries.

According to various embodiments of the invention, the separation between how the compares are done versus how the keys are stored takes advantage of the decreasing size of SRAM over time. That is, with such embodiments, most of the area is in the storage of the keys. The SRAMs keep getting larger as you progress down the pipeline (e.g., by factors of 4), but the area attributable to comparisons stay the same. Thus, for a small binary search pipeline, the area may be dominated by comparison circuitry. However, as the binary search pipeline gets larger, the percentage of area attributable to SRAM grows (e.g., for 64 k, SRAM consumes about 60-70%). Given improvements in SRAM area over time, the binary search pipeline is only going to get better in terms of area. By contrast, for TCAMs, the area overhead is linearly proportional.

Embodiments of the present invention are particularly useful for applications in which the values in the array can be sorted in advance, and in which the values in the array don't change much relative to the number of lookups performed. For example, IP packet routing employs routing tables which are typically modified every minute or two as compared to the hundreds of millions (or even billions) of times per second lookups are performed. Thus, the computational cost of sorting the list every time it is updated is well worth it when one considers the latency and power savings that such an approach represents as compared to more conventional approaches such as, for example, content-addressable memories which employ a power hungry, brute force approach.

It will be understood that the functionalities described herein may be implemented in a wide variety of contexts using a wide variety of technologies without departing from the scope of the invention. That is, embodiments of the invention may be implemented in processes and circuits which, in turn, may be represented (without limitation) in software (object code or machine code), in varying stages of compilation, as one or more netlists, in a simulation language, in a hardware description language, by a set of semiconductor processing masks, and as partially or completely realized semiconductor devices. The various alternatives for each of the foregoing as understood by those of skill in the art are also within the scope of the invention. For example, the various types of computer-readable media, software languages (e.g., Verilog, VHDL), simulatable representations (e.g., SPICE netlist), semiconductor processes (e.g., CMOS, GaAs, SiGe, etc.), and device types (e.g., frame switches) suitable for designing and manufacturing the processes and circuits described herein are within the scope of the invention.

Embodiments of the invention are described herein with reference to switching devices, and specifically with reference to packet or frame switching devices. According to such embodiments and as described above, some or all of the functionalities described may be implemented in the hardware of highly-integrated semiconductor devices, e.g., 1-Gigabit and 10-Gigabit Ethernet switches, various switch system switches, and similar devices.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A circuit configured to perform a search for a key in a sorted list of entries using a plurality of binary search iterations, the circuit comprising:
    a parallel comparison stage comprising N registers each storing a different respective one of the entries, and parallel comparison circuitry configured to compare the key to each of the entries in the N registers in parallel and generate a parallel comparison result including $\log_2 N$ bits, the parallel comparison result corresponding to $\log_2 N$ binary search iterations to search for the key in the sorted list of entries, wherein N is an integer greater than 1; and
    a plurality of pipeline stages configured in a pipeline, each of the plurality of pipeline stages comprising:
        memory storing an orthogonal subset of the entries relative to the subsets of the entries in memories of all others of the plurality of pipeline stages, the memory in each successive pipeline stage having exponentially more storage capacity than an immediately previous pipeline stage and including entries corresponding to a particular one of the binary search iterations; and
        comparison circuitry coupled to receive the $\log_2 N$ bits from the parallel comparison stage, the comparison circuitry configured to select an entry of the memory of the pipeline stage based on a respective index including the $\log_2 N$ bits, to generate a comparison result indicating whether the key is greater than or equal to or less than the selected entry of the memory of the pipeline stage and to pass the key and the comparison result to a subsequent pipeline stage, wherein the respective index also includes a bit based on a comparison result received from a previous pipeline stage.

2. The circuit of claim 1 wherein for each of the plurality of pipeline stages, the memory of the pipeline stage is configured in several parallel slices, each slice including a unique subset of the entries in the memory.

3. The circuit of claim 2 wherein for each of the plurality of pipeline stages, the comparison circuitry of the pipeline stage is configurable to compare different size keys by combining comparisons between slices.

4. The circuit of claim 1 wherein one or more additional bits are associated with the key used by the parallel comparison stage, wherein the additional bits are used to apply additional conditions relating to processing of the key.

5. The circuit of claim 1 wherein the entries in the memory of each of the plurality of pipeline stages correspond to two consecutive binary search iterations, the circuit further comprising speculative comparison circuitry associated with each of the plurality of pipeline stages configured to compare the key to each of two entries associated with the second one of the binary search iterations that correspond to the particular entry, generate speculative comparison results corresponding to the two entries, the comparison circuitry in each memory stage also being configured to select one of the speculative comparison results based on the comparison result received from the immediately preceding memory stage.

6. The circuit of claim 1 wherein for each of the plurality of pipeline stages, the comparison circuitry of the pipeline stage is alternatively configurable to perform a prefix match comparison, an exact match comparison, or a range table comparison.

7. The circuit of claim 1 wherein for each of the plurality of pipeline stages, the memory of the pipeline stage is configured in a plurality of slices, each slice including a unique subset of the entries in the memory, and wherein the comparison circuitry in each of the plurality of pipeline stages is configurable to compare different size keys by combining comparisons between slices.

8. The circuit of claim 7 wherein each slice is configured to identify a particular one of a plurality of actions to perform on a data unit corresponding to the key, and wherein the circuit is configured to identify multiple ones of the actions for keys spanning multiple ones of the slices.

9. An integrated circuit comprising the circuit of claim 1, wherein the integrated circuit comprises a packet switching device.

10. The integrated circuit of claim 9 wherein the packet switching device comprises an Ethernet switch.

11. At least one non-transitory computer-readable medium having data structures stored therein representative of the circuit of claim 1.

12. The at least one non-transitory computer-readable medium of claim 11 wherein the data structures comprise a simulatable representation of the circuit.

13. The at least one non-transitory computer-readable medium of claim 12 wherein the simulatable representation comprises a netlist.

14. The at least one non-transitory computer-readable medium of claim 11 wherein the data structures comprise a code description of the circuit.

15. The at least one non-transitory computer-readable medium of claim 14 wherein the code description corresponds to a hardware description language.

16. A set of semiconductor processing masks representative of at least a portion of the circuit claim 1.

\* \* \* \* \*